United States Patent [19]

Noe

[11] Patent Number: 4,666,684
[45] Date of Patent: May 19, 1987

[54] PROCESS FOR PRODUCING URANIUM DIOXIDE

[75] Inventor: Ronald O. Noe, Columbia, S.C.

[73] Assignee: Westinghouse Electric Corp., Pittsburgh, Pa.

[21] Appl. No.: 580,036

[22] Filed: Feb. 14, 1984

[51] Int. Cl.$^4$ .......................................... C01G 43/025
[52] U.S. Cl. ..................................... 423/19; 423/261
[58] Field of Search .................. 423/19, 261; 252/630

[56] References Cited

U.S. PATENT DOCUMENTS

| | | | |
|---|---|---|---|
| 3,165,376 | 1/1965 | Golliher | 423/7 |
| 3,765,844 | 10/1973 | Rode | 423/261 |
| 3,786,120 | 1/1974 | De Hollander et al. | 264/0.5 |
| 3,842,155 | 10/1974 | Muller et al. | 252/630 |
| 3,862,296 | 1/1975 | Dotson et al. | 423/19 |
| 3,937,784 | 2/1976 | Beutner et al. | 423/19 |
| 3,969,477 | 7/1976 | Keith et al. | 423/19 |
| 3,998,925 | 12/1976 | Fuller | 423/15 |
| 4,020,146 | 4/1977 | Knudsen | 423/19 |
| 4,052,330 | 10/1977 | Jensen et al. | 264/0.5 |
| 4,053,559 | 10/1977 | Hart et al. | 423/261 |
| 4,079,120 | 3/1978 | Cole et al. | 423/261 |
| 4,083,607 | 4/1978 | Mott | 423/261 |
| 4,162,298 | 7/1979 | Holladay et al. | 423/230 |
| 4,234,550 | 11/1980 | De Hollander | 423/261 |
| 4,264,341 | 4/1981 | Kaufmann et al. | 252/630 |

Primary Examiner—Edward A. Miller
Attorney, Agent, or Firm—R. D. Fuerle

[57] ABSTRACT

A process and apparatus for separating uranium-containing particulate matter from the off-gas stream of a calciner, without condensation of ammonium fluoride from the gas stream along with the particulate matter, wherein the off-gas is passed through a filter while maintained at a temperature in excess of 340° C. Preferably, the off-gas stream is forced through the filter by an aspirator, located downstream of the filter, and the filter comprises a plurality of filter units in side-by-side relationship, each of said filter units being purged by a nitrogen gas stream while the off-gas stream continues to flow through the remainder of the filter units for a continuous filtering operation.

11 Claims, 2 Drawing Figures

PROCESS FOR PRODUCING URANIUM DIOXIDE

BACKGROUND OF THE INVENTION

The present process relates to an improved process and apparatus for the preparation of uranium dioxide ($UO_2$) by the calcining of a uranium compound, such as ammonium diuranate (ADU).

In the production of uranium dioxide, a particularly useful process involves the use of uranium hexafluoride and the preparation of an ammonium diuranate intermediate product, which ammonium diuranate is then calcined to produce uranium dioxide. As a general example of such processes, U.S. Pat. No. 3,998,925 teaches the preparation of ammonium diuranate from uranium hexafluoride by a continuous process. The ammonium diuranate serves as an intermediate product in preparation of uranium dioxide having good ceramic properties, with the ammonium diuranate calcined to uranium dioxide. Also, in U.S. Pat. No. 4,079,120, the calcination of ammonium diuranate to uranium dioxide is taught where a chute provided between the outlet of the calcining apparatus and a cooling conveyor is designed to be substantially completely filled at all times, and provide an airtight seal, so as to prevent influx of air into the chute where further oxidation might occur, and to prevent entry of air into the calcining apparatus.

In such processes, an off-gas stream is produced during the calcining of the ammonium diuranate, the off-gas stream containing finely divided uranium-containing particulate matter which must be removed from the off-gas stream. The off-gas stream also contains some ammonium fluoride which condenses as a tenacious solid material on surfaces that are at a temperature below the condensation temperature of the ammonium fluoride.

It is an object of the present invention to provide a process for the removal of uranium-containing particulate matter from the off-gas stream of an ammonium diuranate calcination process, without condensation of ammonium fluoride along with the separated particulate matter.

It is another object of the present invention to provide an apparatus usable in the separation of uranium-containing particulate matter, from the off-gas stream of an ammonium diuranate calciner, that prevents condensation of ammonium fluoride along with the particulate matter.

SUMMARY OF THE INVENTION

The off-gas stream from the calcination of ammonium diuranate to uranium dioxide is treated so as to remove the uranium-containing particulate matter therefrom without condensation of ammonium fluoride therewith. The off-gas stream is maintained at an elevated temperature in excess of about 340° C. while it is passed from the calcining kiln to a filtering means, and through the filtering means, where the particulate matter is removed from the gaseous stream. The filtering is effected in a continuous manner by providing a plurality of filtering units, with means for purging one of the filter units to dislodge particulate matter therefrom while maintaining flow of the off-gas stream through the other filter units. A draft-inducing venturi is preferably used to force the off-gas stream, while at said elevated temperature, through the filter means.

DETAILED DESCRIPTION

In the present process, the off-gas stream from an ammonium diuranate calcining process is treated to remove the uranium-containing particulate matter therefrom, while preventing the condensation of ammonium fluoride during said removal, which ammonium fluoride is subsequently separated from the off-gas.

Figures 1, 3:
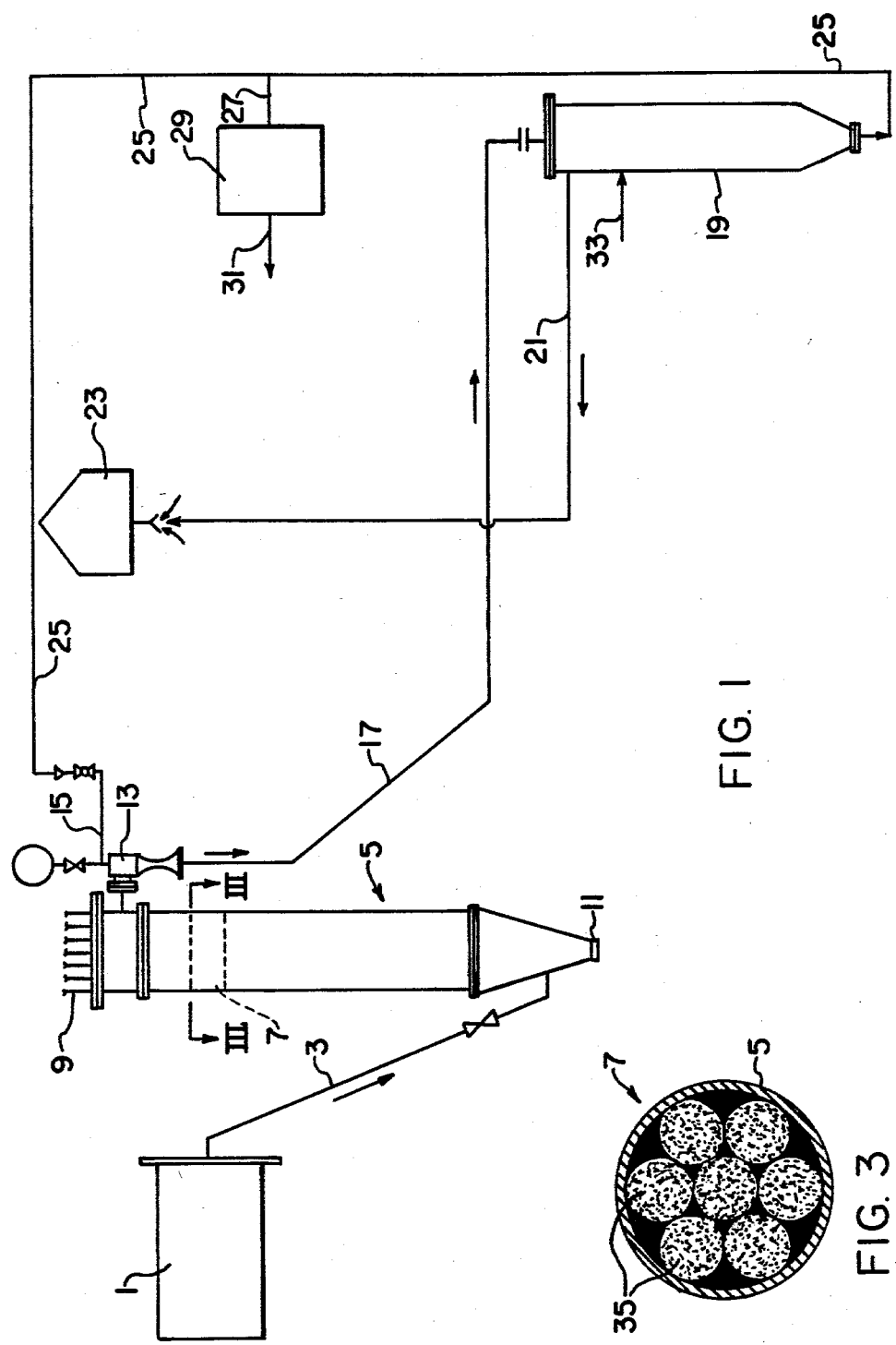
FIG. 1 is a schematic illustration of the process and apparatus of the present invention.
FIG. 3 is a view taken along lines III—III of FIG. 1 showing the use of a plurality of individual filters in the filter unit.

Referring now to FIG. 1, a calcining kiln 1, is illustrated wherein uranium diuranate is heated under conditions that will convert the ammonium diuranate to uranium dioxide. The uranium dioxide so produced is discharged from the kiln 1, through a discharge system (not shown), while off-gases produced are discharged as an off-gas stream through line 3. This off-gas stream will carry some uranium-containing solid particulate matter which must be removed from the stream prior to discharge to the environment, and will also contain some ammonium fluoride which has a tendency to condense on cooler surfaces. The calcining kiln is generally heated to a temperature of over 500° C. and up to 700° C. to effect the conversion of the ammonium diuranate to uranium dioxide. The off-gas stream in line 3 is thus at an elevated temperature, usually between about 360° and 430° C., but will cool, upon removal from the calcining kiln to temperature at which ammonium fluoride will condense therefrom.

The off-gas stream from line 3 passes to a conduit, or elongated vessel 5, which contains a filter means 7 for removal of the uranium-containing particulate matter therefrom. The filter means 7, will preferably comprise a series of filter units, positioned in side-by-side relationship, and lines 9 are provided which will separately backwash each unit. A discharge system 11 is provided on the vessel 5 through which uranium-containing solid particulate material collected, following backwash from the filter means, may be discharged from the vessel. The vessel 5 and filter means 7 are maintained at a temperature in excess of about 340° C. during passage of the off-gas stream therethrough.

The temperature of the off-gas, thus the temperature of the interior of the vessel 5 and the filter means 7, must be maintained above about 340° C. during passage of the off-gas through the filter in order to prevent deposition of ammonium fluoride. The temperature should preferably be kept at a range of between 340°–440° C., with a temperature of about 400° C. being most preferred.

In order to force the off-gas stream through the filter means 7, an aspirating means 13 is provided, downstream from the filter means 7. After the uranium-containing particulate material is removed from the off-gas stream, while maintaining the stream at a temperature in excess of about 340° C., the off-gas stream downstream from the filter means 7, containing ammonium fluoride, is discharged from the vessel 5 through aspirator 13 by a flow of water through the aspirator, the water charged to the aspirator 13 through line 15. The ammonium flouride in the off-gas stream is dissolved in the water and flows through line 17 to a separator tank 19. The off-gas non-condensables from the separator tank 19 are passed through line 21 to a process ventilation pickup 23. A portion of the aqueous medium, discharged from separator tank 19 through line 25, is removed through line 27 and clarified in a clarifier 29, and then discharged to effluent 31. The remainder of the aqueous medium is recycled through line 25 for reuse in line 15 of the aspirator 13. Clean make-up water is added to the separator 19 through line 33.

The filtering means preferably comprises a plurality of filter units 35 which are in side-by-side relationship in the vessel 5 (FIG. 3). These filter units, in tubular shape, are formed of heat resistant filter material, and preferably comprise sintered metal tubes, such as porous sintered metal tubes formed from Nickel 200 material, which will withstand the high temperatures and are chemically resistant to the gaseous components. The sintered metal tubes should have a porosity such that the filter units will retain solid particles of a size of between about 2-10 microns in diameter, preferably retention of particles of about 5 micron diameter particle size.

The pressures within the calcining kiln are generally at atmospheric pressure or only slightly above atmospheric pressure, with a pressure of about 0¼ inch gauge water pressure present. In order to affect flow of the off-gas through the heated filter means 7, the aspirator 13, should provide a suction within the downstream side of the filter, with a suction of about 8–20 inch gauge water pressure applied to induce such flow. In order to backwash or purge the filter units, nitrogen, or other inert gas such as argon or helium, is forced through individual filter units at a pressure about 75 pounds per square inch gauge. An individual filter unit of a plurality of units may be purged while continuing flow of the hot off-gas through the remainder of the filter units so as to provide continuous flow of the off-gases. Only a short purge, such as a fraction of a second, of nitrogen is used to backwash the filter unit, and the filter units may be periodically backwashed in a sequence so as to provide uninterrupted flow of off-gases through the filtering means.

Figure 2:
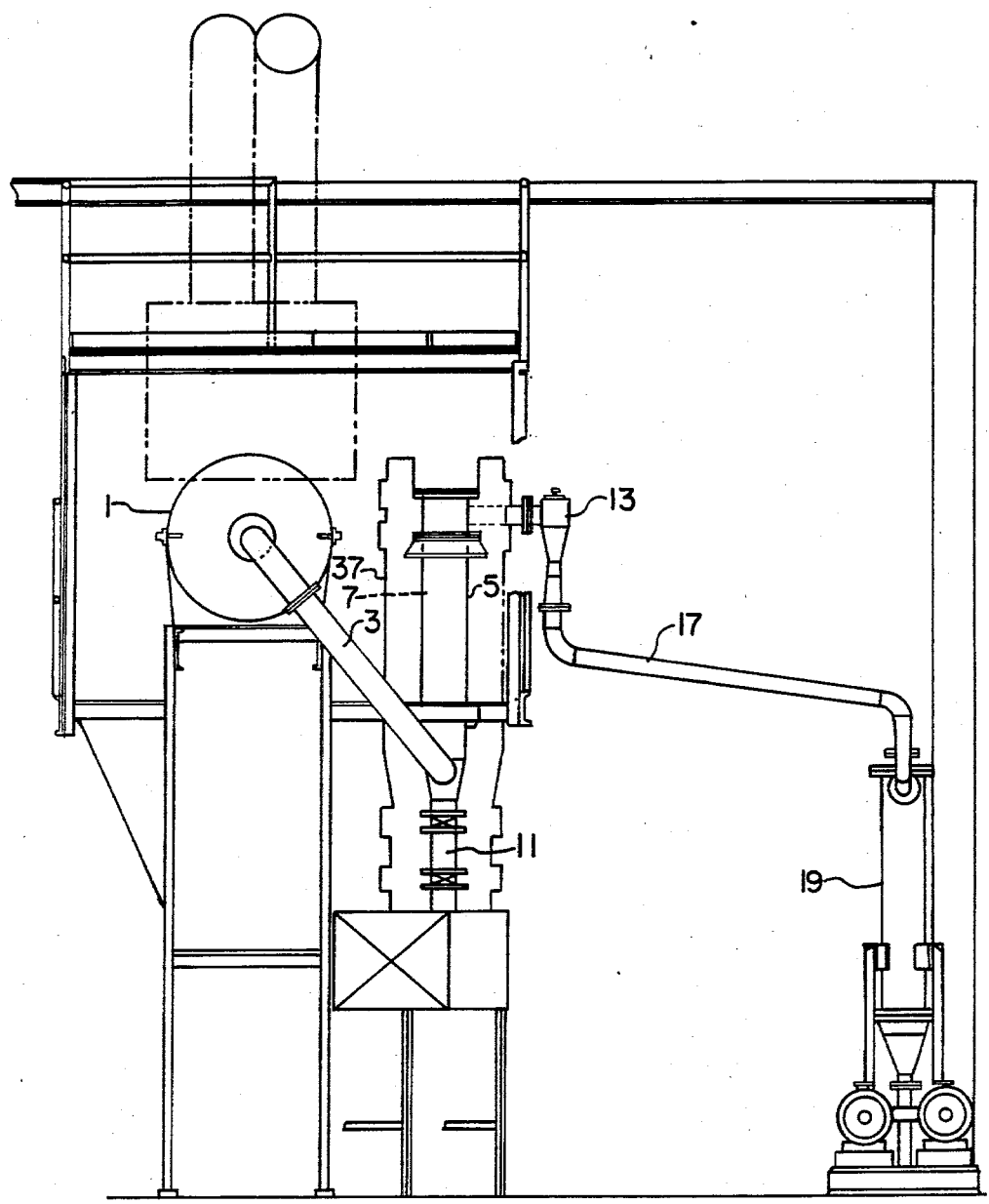
FIG. 2 is a view of the apparatus of the present invention illustrating the end of a calcining kiln and the means for treating the off-gas therefrom.

As illustrated in FIG. 2, the apparatus comprises an off-gas conduit 3 which leads from the kiln 1 to a further conduit 5, which further conduit contains filtering means 7. Means are provided, such as insulation, to maintain the off-gases in conduit 3 at the desired elevated temperature, and the further conduit 5 is preferably enclosed in a housing 37 which is provided with conventional heating means to maintain the temperature of conduit 5 and filter 7 at the desired elevated temperature. The conduit 5, downstream from the filter means 7, is connected to an aspirator 13, and discharge from the aspirator 13 passes to a separator tank 19 and subsequent equipment for removing the ammonium fluoride from the aspirator discharge stream. The solids dislodged from the filter means 7 by purging with an inert gas are collected in a discharge system 11 for subsequent removal, and recovery.

What is claimed is:

1. In a process for the production of uranium dioxide powder by calcining a uranium compound, whereby an off-gas stream is produced by an ammonium diuranate calciner which contains ammonium fluoride vapor and uranium-containing particulate matter, the improvement comprising:
   (A) maintaining said off-gas stream after discharge from said calciner at an elevated temperature in excess of about 340° C.;
   (B) passing said off-gas stream while at said elevated temperature into a separate vessel, also maintained at a temperature in excess of about 340° C.;
   (C) passing said off-gas in said separate vessel through a filter within said separate vessel, so that said uranium-containing particulate matter is retained within said separate vessel while said ammonium fluoride vapor passes through said filter while at said elevated temperature; and
   (D) contacting said ammonium fluoride vapor from said off-gas after it passes through said filter with water to form an aqueous solution of ammonium fluoride.

2. The process as defined in claim 1 wherein said off-gas stream is maintained at a temperature of between 340°–440° C.

3. The process as defined in claim 1 wherein said off-gas stream is maintained at a temperature of about 400° C. on passage through said filter.

4. The process as defined in claim 1 wherein said filter is comprised of a plurality of filter units.

5. The process as defined in claim 4 including the step of intermittently purging each of said filter units to dislodge uranium-containing particulate matter therefrom, while continuing passage of said off-gas through the remainder of said filter units.

6. The process as defined in claim 1 wherein said off-gas stream is passed through said filter by means of a draft from an aspirator downstream of said filter.

7. In a process for the production of uranium dioxide powder by calcining a uranium compound, whereby an off-gas stream is produced by an ammonium diuranate calciner which contains ammonium fluoride vapor and uranium-containing particulate matter, the improvement comprising:
   (A) maintaining said off-gas stream after discharge from said calciner at an elevated temperature in excess of about 340° C.;
   (B) passing said off-gas stream while at said elevated temperature into a separate vessel, also maintained at a temperature in excess of about 340° C.;
   (C) passing said off-gas in said separate vessel through a filter within said separate vessel, which comprises a plurality of units in side-by-side relationship, so that said uranium-containing particulate matter is retained on said filter while said ammonium fluoride vapor passes through said filter while at said elevated temperature; and
   (D) contacting said ammonium fluoride vapor from said off-gas, after it passes through said filter with water to form an aqueous solution of ammonium fluoride;
   (E) intermittently purging each of said units in said filter to discharge said uranium-containing particulate matter therefrom, while continuing passage of said off-gas through the remainder of said units.

8. The process as defined in claim 7 including the step of intermittently purging each of said filter units to dislodge uranium-containing particulate matter therefrom, while continuing passage of said off-gas through the remainder of said filter units.

9. The process as defined in claim 7 wherein said purging is with nitrogen gas.

10. The process as defined in claim 1 wherein said off-gases pass in a downward direction from said ammonium diurinate calciner, and in an upward direction through said vessel and said filter.

11. The process as defined in claim 7 wherein said off-gases pass in a downward direction from said ammonium diurinate calciner, and in an upward direction through said vessel and said filter units.

* * * * *